(12) United States Patent
Von Berg

(10) Patent No.: US 10,458,277 B1
(45) Date of Patent: Oct. 29, 2019

(54) AXIALLY SPACED RESTRICTED DAMPER

(71) Applicant: United Technologies Corporation, Farmington, CT (US)

(72) Inventor: Kaleb Von Berg, New Britain, CT (US)

(73) Assignee: United Technologies Corporation, Farmington, CT (US)

(*) Notice: Subject to any disclaimer, the term of this patent is extended or adjusted under 35 U.S.C. 154(b) by 0 days.

(21) Appl. No.: 16/040,825

(22) Filed: Jul. 20, 2018

(51) Int. Cl.
| F16C 19/06 | (2006.01) |
| F01D 25/16 | (2006.01) |
| F16C 33/58 | (2006.01) |

(52) U.S. Cl.
CPC .......... *F01D 25/164* (2013.01); *F16C 19/06* (2013.01); *F16C 33/583* (2013.01); *F05D 2240/50* (2013.01); *F05D 2260/96* (2013.01); *F16C 2360/23* (2013.01)

(58) Field of Classification Search
CPC .............................. F01D 25/164; F16C 27/045
See application file for complete search history.

(56) References Cited

U.S. PATENT DOCUMENTS

| 4,440,456 A | * | 4/1984 | Klusman ............ F16C 27/045 384/581 |
| 9,702,404 B2 | | 7/2017 | Smedresman et al. |
| 9,714,584 B2 | | 7/2017 | Morris |
| 9,841,056 B2 | | 12/2017 | Snow et al. |
| 2018/0051706 A1 | | 2/2018 | DiBenedetto |

* cited by examiner

*Primary Examiner* — Thomas R Hannon
(74) *Attorney, Agent, or Firm* — O'Shea Getz P.C.

(57) ABSTRACT

A bearing assembly comprises a housing that includes a first housing surface and a second housing surface. The first and second housing surfaces are substantially axially parallel with respect to a rotor centerline. The bearing assembly also comprises a damped outer race that includes a first outer race surface radially adjacent to and opposing the first housing surface which is located radially interior to the first outer race surface. A second outer race surface is radially adjacent to and opposing the second housing surface which is located radially exterior to the second outer race surface. The housing comprises an oil passage that is configured to provide oil from an outlet to a first space between the first outer race surface and the first housing surface, and configured to provide oil to a second space radially between the second outer race surface and the second housing surface.

12 Claims, 4 Drawing Sheets

AXIALLY SPACED RESTRICTED DAMPER

BACKGROUND OF THE INVENTION

1. Technical Field

The present disclosure relates generally to gas turbine engines, and more particularly to a bearing where radial motion is damped by radially separated damper oil film segments that resist bearing radial motion.

2. Background Information

The rotating shafts and other rotating turbomachinery of a gas turbine engine are supported from a non-rotating structure by arrays of anti-friction bearings. In many engines, anti-friction bearings are enclosed in bearing compartments that allow them to be more easily lubricated and cooled.

Many bearing compartments, especially those containing multiple damped bearings, have small interiors, making incorporation of oil jets, scoops, retaining features, seal assemblies, and other components as well as assembly, maintenance, and repair tasks difficult. In a damped bearing, the outer race is shaped to form an annular cavity between the outer race and the bearing support, which forms a squeeze film damper (SFD) when filled with a damping fluid. With this configuration, radial displacement of the outer race relative to the bearing support is restrained by squeeze film pressure. An example of such a damped bearing is disclosed in U.S. Pat. No. 9,702,404 (the '404 Patent), which is assigned at the assignee of the present invention and incorporated herein by reference.

FIG. 1 is a cross-sectional view of a prior art bearing compartment 10 taken along rotor centerline 12 of a gas turbine engine in which forward bearing 14 and aft bearing 16 are damped by forward damping cavity 18 and aft damping cavity 20, respectively. Extending from the forward bearing 14 to the aft bearing 16, centering spring 22 includes flange 24, body 26, and resilient member 29 extending from the flange 24 to the body 26. The forward bearing 14 and the aft bearing 16 are anti-friction bearings of known design. The forward bearing has outer race 14a, inner race 14b, rolling elements 14c, and cage 14d. The aft bearing 16 has an outer race 16a, an inner race 16b, rolling elements 16c, and cage 16d. The forward bearing 14, the aft bearing 16, and the centering spring 22 restrain first spool 28 and second spool 30, which are concentrically disposed about the rotor centerline 12. In some embodiments the first spool 28 is a high pressure spool of a gas turbine engine whereas the second spool 30 is a low pressure spool of a gas turbine engine. However, any bearing compartment containing multiple bearings in which dynamics analysis of the mating shafts require the bearings to be damped and at least one bearing to be disposed at a sprung end of the centering spring 22 can benefit from the space-saving and fatigue life advantages of features described in the bearing compartment 10.

Bounding the bearing compartment 10 at its radial extent is a casing 32, which has a generally annular cross-section along a plane perpendicular to the rotor centerline 12 that varies, as required, along a length of the rotor centerline 12 to accommodate geometry of the bearing compartment 10. The casing 32 radially restrains one end of the centering spring 22 by engaging radially outer surface 34 of the flange 24. For example, some embodiments include a location or interference fit between the radially outer surface 34 of the flange 24 and a radially inner surface of the casing 32. Axially restraining the centering spring 22 with respect to the casing 32 is axial stop 36. Formed by an upstream-facing surface of the casing 32, the stop 36 engages a downstream-facing surface of the flange 24. Restraining the centering spring 22 in the opposing axial direction is a retaining nut 38, which engages an internal threaded portion of the casing 32. When the nut 38 is tightened against an upstream-facing surface of the flange 24, the centering spring 22 is captured between the retaining nut 38 and the stop 36 of the casing 32. Rotation of the retaining nut 38 and subsequent loosening of the centering spring 22 is prevented by methods known in the art. For example, an anti-rotation tab (not shown in FIG. 1) affixed to the casing 32 prevents rotation of the nut 38 relative to the casing 32. In other regions of the bearing compartment 10, similar anti-rotation mechanisms may be used to prevent loosening of threaded joints.

At radially inner surface 42 of the flange 24, the outer race 14a is spaced therefrom to define the damping cavity 18. Piston seals 44a and 44b enclose axial ends of the damping cavity 18 such that fluid delivered to the cavity 18 is captured between the flange 24 and the forward bearing 14. Supplying the damping cavity 18 with a damping fluid (e.g., the lubrication fluid supplied to the bearing compartment 10) radially restrains the forward bearing 14 with respect to the centering spring 22 and the casing 32. The flange 24 includes axial stop 46, which protrudes radially inward from the flange 24 at an aft end of the flange 24 such that it is positioned axially downstream from the outer race 14a. Restraining the forward bearing 14 is the opposing axial direction is retaining element 40, which protrudes radially inward relative to the radially inner surface 42 of the flange 24.

The inner race 14b of the forward bearing 14 is affixed to a shaft 48 using, for example, a location or interference fit between mating surfaces of the inner race 14b and the shaft 48. The shaft 48 is concentrically assembled with respect to and configured to rotate about the rotor centerline 12. Axial stop 54 and nut 56 axially capture the inner race 14b onto the shaft 48. The stop 54 is formed by a portion of the shaft 48 which extends radially outward from an outer surface of the shaft 48. The nut 56 engages a threaded portion at an aft end of the shaft 48. With this arrangement, the forward bearing 14 radially restrains the shaft 48 with respect to the centering spring 22 and the casing 32 while the damping cavity 18 modifies the radial stiffness at the forward bearing 14 to satisfy dynamic conditions of the spool 28.

Extending axially from the flange 24 to the body 26, the centering spring 22 includes the resilient member 29. The resilient member 29 may be a single cylindrical member extending from the flange 24 to the body 26, providing a relatively stiff and robust resilient member as compared to multi-beam resilient members used in other embodiments. In such other embodiments, the resilient member includes a plurality of discrete resilient beams which are circumferentially-spaced about the rotor centerline 12. Each of the beams 29 has a cross-sectional area along a plane perpendicular to the rotor centerline 12 that varies along the axial length of each of the beams 29 between the flange 24 and the body 26. For example, each of the beams 29 can have a substantially polygonal cross-section, circular cross-section, or oval-shaped cross-section along its length. These cross-sections can have a decreasing cross-sectional area between the flange 24 and a midpoint of the beams 29 and an increasing cross-sectional area between the midpoint of the beams 29 and the body 26, the midpoint of the beams 29 being a location approximately equal to half the axial length of the beam 29. Moreover, to uniformly distribute bending stresses within the beams 29, some embodiments vary the cross-sections proportionally in a height direction that is generally aligned with a radial direction with respect to the rotor centerline 12 and a width direction that is generally tangent to a circumferential direction with respect to the rotor centerline 12.

At an aft end of the centering spring 22, the outer race 16a of the aft bearing 16 engages a radially inner surface 60 of the body 26, thereby radially restraining the aft bearing 16 with respect to the body 26. The outer race 16a is axially restrained in a similar manner as the outer race 14a, being captured between a stop, which protrudes from the inner surface 60, and a retaining element. At a radially outer extent of the body 26, outer surface 62 is spaced from an opposing surface of the casing 32 to form the damping cavity 20. Like the damping cavity 18, the damping cavity 20 has axial ends that are enclosed by piston ring seals 64a and 64b. The piston rings seals 64a and 64b are captured within grooves 66a and 66b which extend circumferentially along the outer surface 62 of the body 26.

Generally, the body 26 has an annular cross-section in a plane perpendicular to the rotor centerline 12 and has a radial dimension sufficient to span between the casing 32 and the outer race 16a of the aft bearing 16. Because this radial span is generally not required for strength, the body 26 optionally includes channels 68a and 68b that extend circumferentially along respective axial ends of the body 26. Moreover, the body 26 can also include a plurality of axially-extending through-holes 70 that are circumferentially spaced with respect to the rotor centerline 12 in a region of the body 26 between the inner surface 60 and the outer surface 62 of the body 26. For example, the channels 68a and 68b can be semi-circular or have a full-radius shape, and the through-holes 70 can have a circular cross-section to reduce stress concentrations resulting from these features. Thus, the channels 68a and 68b and the through-holes 70 reduce the weight of the body 26 without reducing the mechanical performance of the centering spring 22.

The aft bearing 16 engages shaft 72, which rotates about the rotor centerline 12, at radially inner surface 74 of the inner race 16b. Like the forward bearing 14, the inner race 16b of the aft bearing 16 is radially restrained by a location or interference fit between the inner surface 74 and an outer surface of the shaft 72. The bearing 16 is axially captured between stop 76 and nut 78. The stop 76 is formed by a radially extending portion of the shaft 72 that forms an axial face for engaging the inner race 16b. The nut 78 engages a threaded portion of the shaft 72 disposed upstream from the aft bearing 16. Thus, the aft bearing 16 has a radial stiffness determined at least in part by the bending stiffness of the resilient member 29 and the damping cavity 20.

The damping characteristics of the damping cavities 18 and 20 and the stiffness characteristics of the centering spring 22, which is primarily determined by the stiffness of the resilient member 29, are selected using methods known in the art and, typically, are a defined range determined through dynamic analysis of the spool 28 and the spool 30. Deflections, especially radial defections, of the body 26 relative to the flange 24 are restrained by a restoring force produced by the deformation the resilient member along with the damping effect produced by fluid within the damping cavity 20 during operating of the gas turbine engine.

To facilitate this configuration, the flange 24 defines one or more passages 80 that extend from the radially outer surface 34 to the radially inner surface 42 to communicate with the damping cavity 18 through which a damping fluid flows during operation of the gas turbine engine. In some embodiments, the flange 24 includes groove 82, which extends circumferentially along the outer surface 34 to evenly distribute the damping fluid among a plurality of passages 80. The plurality of passages 80 extend in at least a radial direction while being circumferentially-distributed within the flange 24 in order to evenly distribute damping fluid within the damping cavity 18 during operation of the gas turbine engine.

With this configuration, the centering spring 22 functions as a bearing support which would otherwise support the forward bearing 14. Integrating the centering spring and bearing support functions into one component (e.g., the centering spring 22) reduces the number of components within the bearing compartment 10 and permits the centering spring 22 to occupy a larger axial space within the bearing compartment 10 than a similarly-sized compartment with discrete bearing supports and centering spring. Thus, the centering spring 22 can be designed with a longer resilient member 29 than would otherwise be possible, decreasing the bending stresses in the resilient member 29 for a given spring stiffness and bearing deflection. Reducing the bending stresses carried by the resilient member 29 results in a more reliable, longer fatigue life centering spring.

As disclosed in the '404 Patent, referring still to FIG. 1, the damping cavity extends axially between the piston seals 44a and 44b and radially between the radially inner surface 42 of the flange and the radially outer surface of the outer race 14a. This provides a damping cavity of axial length of $L_0$ between the piston seals 44a and 44b. The damping cavity receives oil via passages 80 and 82.

Bearing compartments such as the traditional bearing damper illustrated in FIG. 1 may consume too much axial space for certain applications. This can result in interference with other bearing compartment hardware, minimal to non-existent material provisions in the damper to retain the piston rings, and the inability to meet rotor dynamic requirements for the damper oil film pressure and flow, and engine operation. As bearing compartments become smaller, with the push to reduce the flow path diameter, space is at a premium which presents a challenge in packaging bearing dampers to provide essential rotor dynamic damping and meet the requirements of proper rotor dynamic behavior. As a result, there is a need for a damper of reduced axial length.

SUMMARY OF THE DISCLOSURE

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a bearing assembly comprising a bearing housing that includes a first bearing housing surface and a second bearing housing surface where the first and second bearing housing surfaces are substantially axially parallel with respect to a rotor centerline. The bearing assembly also comprises a damped outer race that includes a first outer race surface radially adjacent to and opposing the first bearing housing surface which is located radially interior to the first outer race surface; a first piston ring groove in the first outer race surface, where the first piston ring groove comprises a first piston ring that seals between the first bearing housing surface and the first outer race surface; a second outer race surface radially adjacent to and opposing the second bearing housing surface which is located radially exterior to the second outer race surface; and a second piston ring groove in the second outer race surface, where the second piston ring groove comprises a second piston ring that seals between the second bearing housing surface and the second outer race surface. The bearing housing comprises an oil passage that is configured to provide oil from an outlet to a first space of axial length $L_1$ radially between the first outer race surface and the first bearing housing surface, and configured to provide oil to a second space of axially length $L_2$ radially between the second outer race surface and the second bearing housing surface.

The damped outer race may be held axially adjacent to the bearing housing by a retainer ring.

The first piston seal may be axially offset from the second piston seal.

The first piston seal may be axially aligned with the second piston seal.

The oil passage may extend in a substantially axial direction with respect to the rotor centerline to provide oil to a third space that connects the first space and the second space.

Aspects of the disclosure are also directed to an assembly that comprises a bearing housing that includes a first bearing housing surface and a second bearing housing surface where the first and second bearing housing surfaces are substantially parallel with respect to a rotor centerline. The assembly also comprises a damped outer race that includes a first outer race surface radially adjacent to and opposing the first bearing housing surface which is located radially interior to the first outer race surface; a first piston ring groove in the first outer race surface, where the first piston ring groove comprises a first piston ring that seals between the first bearing housing surface and the first outer race surface; a second outer race surface radially adjacent to and opposing the second bearing housing surface which is located radially exterior to the second outer race surface; a second piston ring groove in the second outer race surface, where the second piston ring groove comprises a second piston ring that seals between the second bearing housing surface and the second outer race surface. The assembly further comprises a bearing radially interior to the damped outer race. The bearing housing comprises a fluid passage configured to provide a fluid film to a first space radially between the first outer race surface and the first bearing housing surface, and configured to provide the fluid film to a second space radially between the second outer race surface and the second bearing housing surface to damp radial motion of the bearing.

The fluid passage may extend in a substantially axial direction with respect to the rotor centerline to provide oil to a third space that interconnects and provides oil to the first space and the second space.

The first piston seal may be axially offset from the second piston seal.

The first piston seal may be axially aligned with the second piston seal.

Aspects of the disclosure are also directed to an assembly that comprises a bearing housing that includes a first bearing housing surface and a second bearing housing surface where the first and second bearing housing surfaces are substantially parallel with respect to a rotor centerline. The assembly also comprises a damped outer race that includes a first outer race surface radially adjacent to and opposing the first bearing housing surface which is located radially interior to the first outer race surface; and a second outer race surface radially adjacent to and opposing the second bearing housing surface which is located radially exterior to the second outer race surface. The assembly further comprises a rotary bearing radially interior to and radially adjacent to the damped outer race. The bearing housing may comprise a passage configured to provide an lubricant to a first space radially between the first outer race surface and the first bearing housing surface, and provide lubricant to a second space radially between the second outer race surface and the second bearing housing surface to damp radial motion of the bearing.

The assembly may further comprise a first piston ring groove in the first outer race surface, where the first piston ring groove comprises a first piston ring that seals between the first bearing housing surface and the first outer race surface; and a second piston ring groove in the second outer race surface, where the second piston ring groove comprises a second piston ring that seals between the second bearing housing surface and the second outer race surface.

The first piston seal may be axially offset from the second piston seal.

The first piston seal may be axially aligned with the second piston seal.

DETAILED DESCRIPTION

Figure 1:
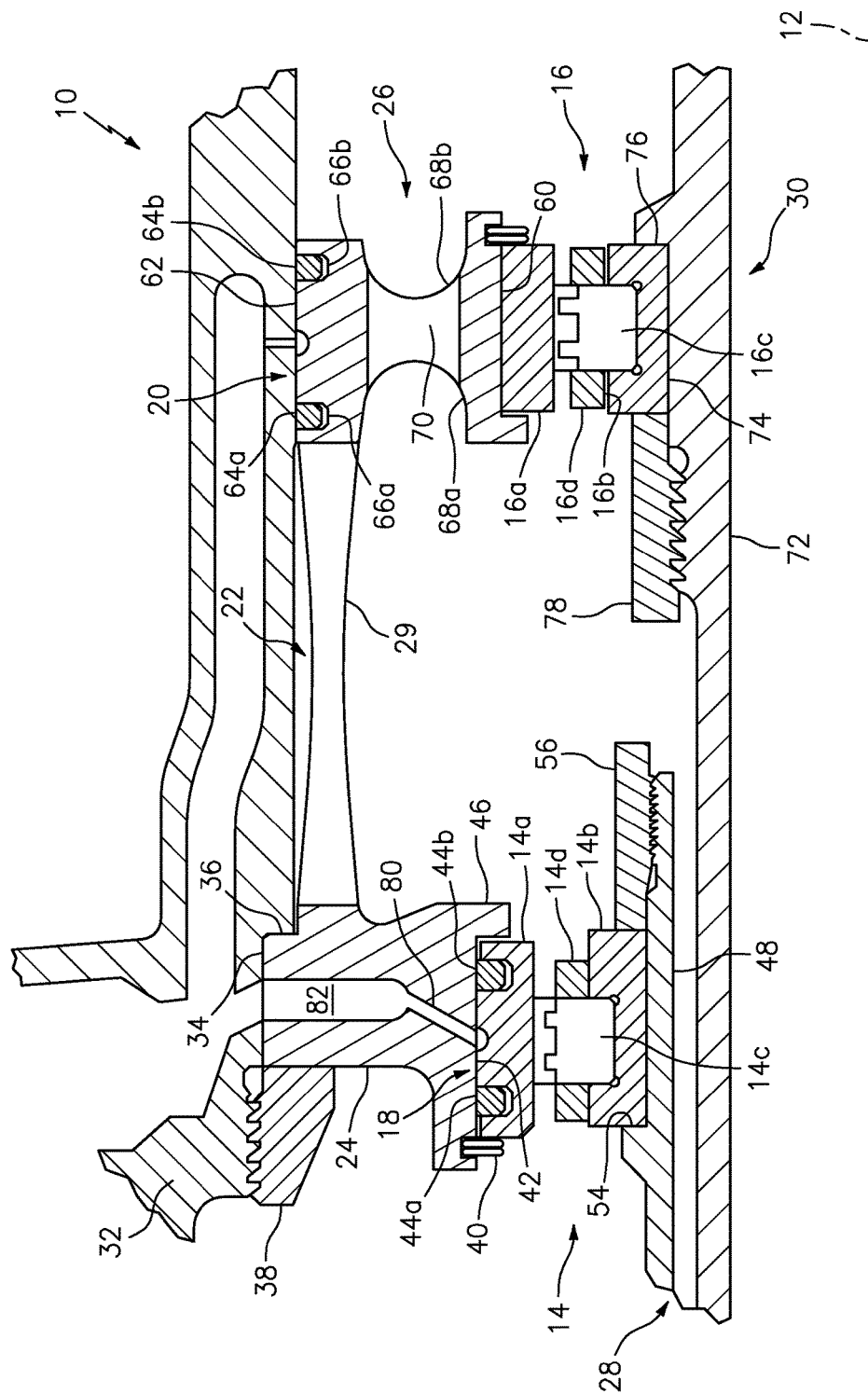
FIG. 1 is a cross-sectional view taken along a rotor centerline of a prior art gas turbine engine configured to form damping cavities for the forward and aft bearings supported by a centering spring.

It is noted that various connections and steps are set forth between elements in the following description and in the drawings (the contents of which are incorporated in this specification by way of reference). It is noted that these connections and steps are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

As discussed in the background set forth above, the prior art includes an arrangement as set forth in FIG. 1.

Aspects of the disclosure may be applied in connection with a gas turbine engine.

Figure 2:
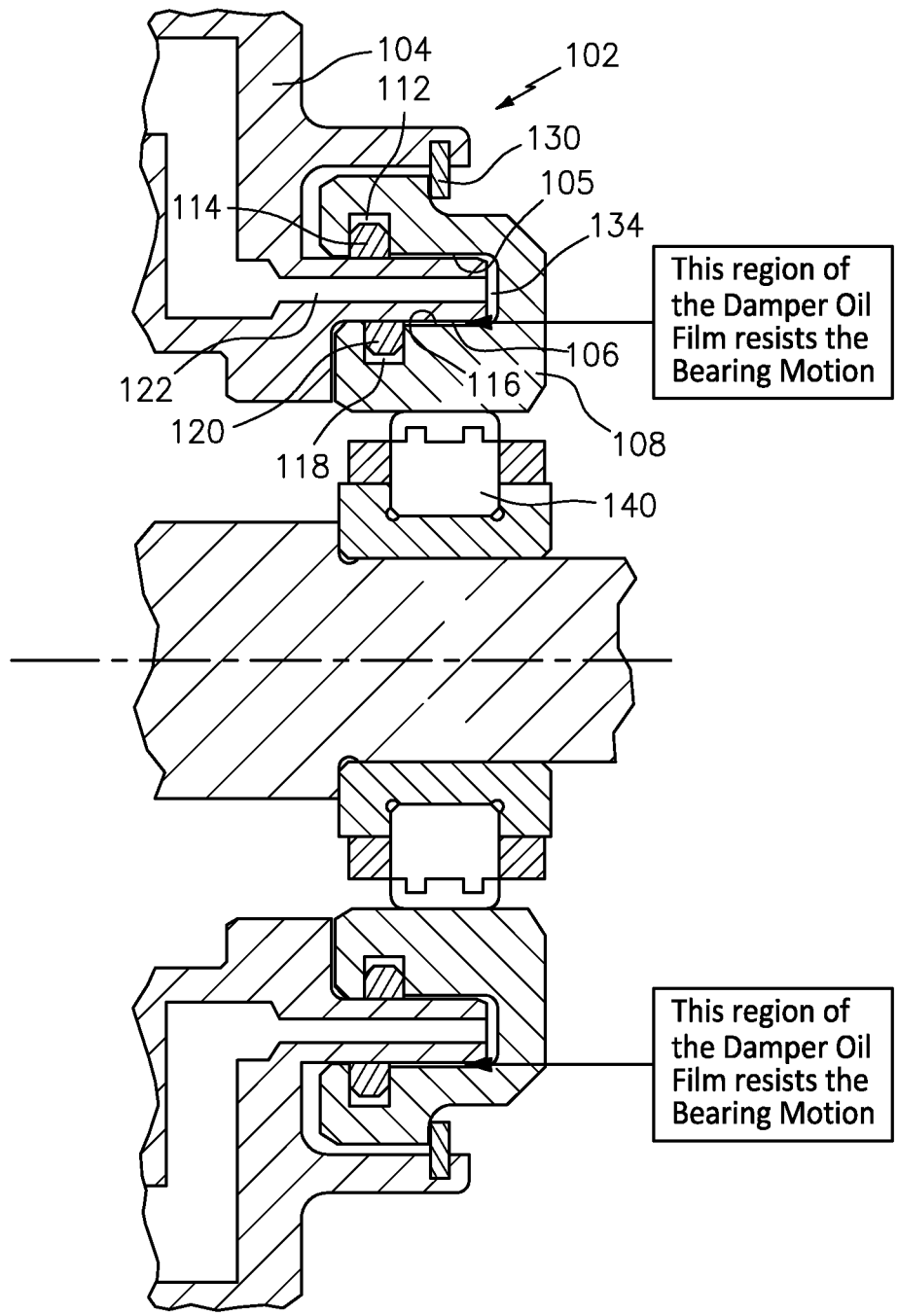
FIG. 2 is a cross-sectional view of a bearing assembly taken along a rotor centerline of a gas turbine engine showing radially separated damping cavities that combine to provide an effective damper length.

FIG. 2 is a cross-sectional view taken along a rotor centerline of a gas turbine engine showing radially separated damping cavities that combine to provide an effective damper length. A bearing assembly 102 includes a bearing housing 104 that comprises a first bearing housing surface 105 and a second bearing housing surface 106. The first and second bearing housing surfaces 105 and 106 are substantially parallel.

The bearing assembly 102 also includes a damped outer race 108 that comprises a first outer race surface 110 radially adjacent to and opposing first bearing housing surface 105 which is located radially interior to the first outer race surface 110. A first piston ring groove 112 is located in the first outer race surface 110 and comprises a first piston ring 114 that seals between the first bearing housing surface 105 and the first outer race surface 110.

A second outer race surface 116 is located radially adjacent to and opposing the second bearing housing surface 106 which is located radially exterior to the second outer race surface 116. A second piston ring groove 118 is located in the second outer race surface 116 and comprises a second piston ring 120 that seals between the second bearing housing surface 106 and the second outer race surface 116.

Figure 3:
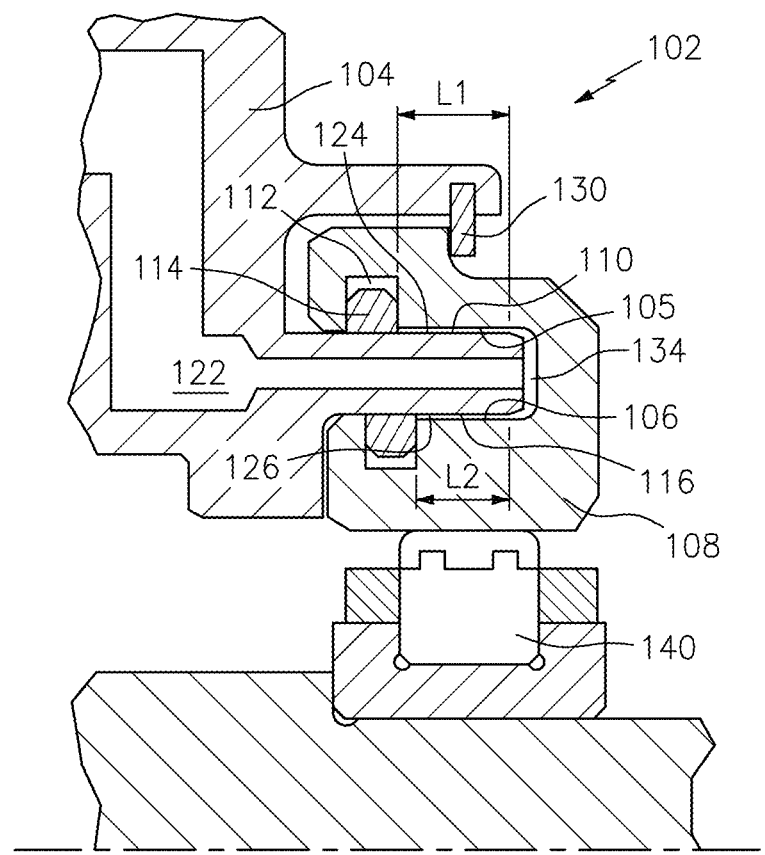
FIG. 3 is a cross-sectional view of the bearing assembly of FIG. 2 taken along a rotor centerline to show the effective damper length $L_1+L_2$.

Referring now to FIGS. 2 and 3, the bearing housing 104 further comprises an oil passage 122 that is configured to provide oil to a first space 124 of axial length $L_1$ located radially between the first outer race surface 110 and the first bearing housing surface 105. The oil passage 122 is also configured to provide oil to a second space 126 of axially length $L_2$ located radially between the second outer race surface 116 and the second bearing housing surface 106. Notably the radially divided spaces 124, 126 associated with axial lengths $L_1$ and $L_2$, respectively, allow the designer to achieve the desired axial damper length by sub-dividing the axial damper into radially separated segments that combine to provide the desired axial damper length. For example, rather than providing an axially contiguous damper segment $L_0$ as shown in prior art FIG. 1, in one embodiment the damper segment may be sub-divided into radially separated segments. This innovation efficiently packages an effectively longer damper of length $L_1+L_2$ into an axially compressed space by "stacking" the surfaces of the damper between which damper oil film flows. This provides the desired rotor dynamic damping to meet the requirements for proper rotor dynamic behavior.

The damped outer race 108 may be held axially adjacent to the bearing housing by a retainer ring 130.

The first piston seal 114 may be axially offset from the second piston seal 120 as shown in FIGS. 2 and 3. Alternatively, the first piston seal 114 may be axially aligned with the second piston seal 120.

The oil passage 122 may extend in a substantially axial direction to discharge oil to a third space 134 that radially connects the first space 124 and the second space 126. The oil film in the first and second spaces 124, 126 is contained between the surfaces of the bearing housing 104 and the damped outer race 108. The oil film pressure is maintained and the flow is restricted by the first and second piston seals 114 and 120, which are contained within the grooves 112, 118 respectively in the damped outer race 108. Radial motion of a bearing 140 is dynamically damped by the damper oil film in the first and second spaces 124, 126.

Figure 4:
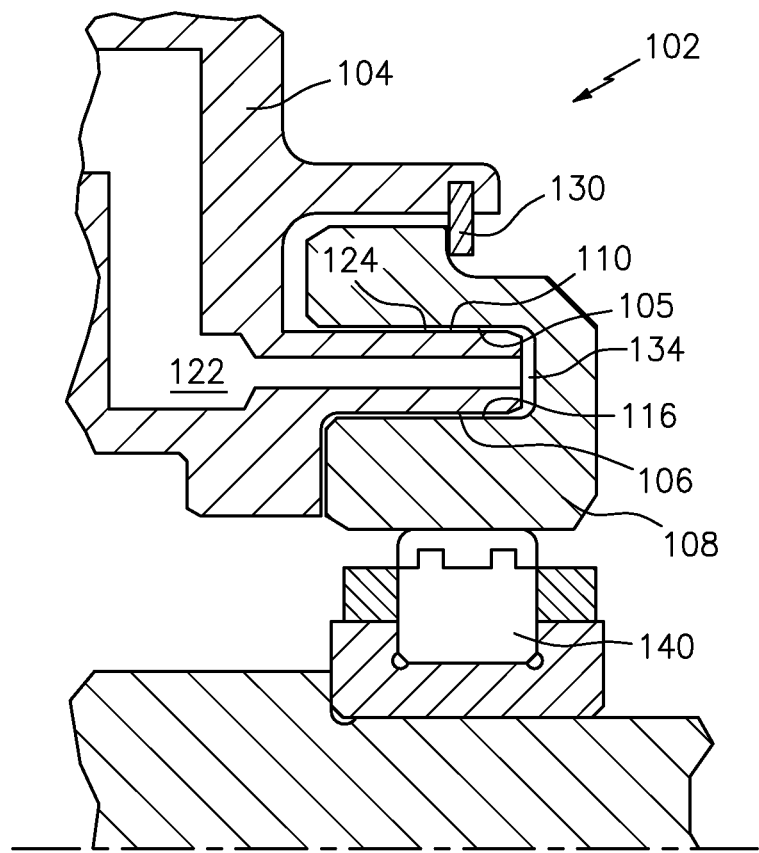
FIG. 4 is a cross-sectional view of an alternative embodiment bearing assembly taken along a rotor centerline.

FIG. 4 is a cross-sectional view of an alternative embodiment bearing assembly 200 taken along a rotor centerline. This embodiment is substantially the same as the embodiment illustrated in FIGS. 2 and 3, with the principal exception that the embodiment of FIG. 4 does not include piston rings and their associated grooves, and is generally referred to as an open damper assembly. In contrast, the embodiment illustrated in FIGS. 2 and 3 may be referred to as a closed damper arrangement since it includes the piston rings.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments. For example, it is contemplated that the dirt separator for internally cooled components disclosed herein is not limited to use in vanes and blades, but rather may also be used in combustor components or anywhere there may be dirt within an internal flowing passage.

It should be understood that like reference numerals identify corresponding or similar elements throughout the several drawings. It should also be understood that although a particular component arrangement is disclosed in the illustrated embodiment, other arrangements will benefit herefrom.

The foregoing description is exemplary rather than defined by the features within. Various non-limiting embodiments are disclosed herein; however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A bearing assembly, comprising:
   a bearing housing comprising a first bearing housing surface and a second bearing housing surface where the first and second bearing housing surfaces are substantially axially parallel with respect to a rotor centerline;
   a damped outer race, comprising
      a first outer race surface radially adjacent to and opposing the first bearing housing surface which is located radially interior to the first outer race surface;
      a first piston ring groove in the first outer race surface, where the first piston ring groove comprises a first piston ring that seals between the first bearing housing surface and the first outer race surface;
      a second outer race surface radially adjacent to and opposing the second bearing housing surface which is located radially exterior to the second outer race surface; and
      a second piston ring groove in the second outer race surface, where the second piston ring groove comprises a second piston ring that seals between the second bearing housing surface and the second outer race surface;
   where the bearing housing comprises an oil passage that is configured to provide oil from an outlet to a first space of axial length $L_1$ radially between the first outer race surface and the first bearing housing surface, and configured to provide oil to a second space of axially length $L_2$ radially between the second outer race surface and the second bearing housing surface.

2. The bearing assembly of claim 1, where the damped outer race is held axially adjacent to the bearing housing by a retainer ring.

3. The bearing assembly of claim 1, where the first piston seal is axially offset from the second piston seal.

4. The bearing assembly of claim 1, where the first piston seal is axially aligned with the second piston seal.

5. The bearing assembly of claim 1, where the oil passage extends in a substantially axial direction with respect to the rotor centerline to provide oil to a third space that connects the first space and the second space.

6. An assembly, comprising:
   a bearing housing comprising a first bearing housing surface and a second bearing housing surface where the first and second bearing housing surfaces are substantially parallel with respect to a rotor centerline;
a damped outer race comprising
   a first outer race surface radially adjacent to and opposing the first bearing housing surface which is located radially interior to the first outer race surface;
   a first piston ring groove in the first outer race surface, where the first piston ring groove comprises a first piston ring that seals between the first bearing housing surface and the first outer race surface;
   a second outer race surface radially adjacent to and opposing the second bearing housing surface which is located radially exterior to the second outer race surface;
   a second piston ring groove in the second outer race surface, where the second piston ring groove comprises a second piston ring that seals between the second bearing housing surface and the second outer race surface; and
a bearing radially interior to the damped outer race;
where the bearing housing comprises a fluid passage configured to provide a fluid film to a first space radially between the first outer race surface and the first bearing housing surface, and configured to provide the fluid film to a second space radially between the second outer race surface and the second bearing housing surface to damp radial motion of the bearing.

7. The assembly of claim 6, where the fluid passage extends in a substantially axial direction with respect to the rotor centerline to provide oil to a third space that interconnects and provides oil to the first space and the second space.

8. The assembly of claim 7, where the first piston seal is axially offset from the second piston seal.

9. The assembly of claim 7, where the first piston seal is axially aligned with the second piston seal.

10. An assembly, comprising:
a bearing housing comprising a first bearing housing surface and a second bearing housing surface where the first and second bearing housing surfaces are substantially parallel with respect to a rotor centerline;
a damped outer race comprising
   a first outer race surface radially adjacent to and opposing the first bearing housing surface which is located radially interior to the first outer race surface;
   a second outer race surface radially adjacent to and opposing the second bearing housing surface which is located radially exterior to the second outer race surface;
a rotary bearing radially interior to and radially adjacent to the damped outer race;
   a first piston ring groove in the first outer race surface, where the first piston ring groove comprises a first piston ring that seals between the first bearing housing surface and the first outer race surface; and
   a second piston ring groove in the second outer race surface, where the second piston ring groove comprises a second piston ring that seals between the second bearing housing surface and the second outer race surface;
where the bearing housing comprises a passage configured to provide an lubricant to a first space radially between the first outer race surface and the first bearing housing surface, and provide lubricant to a second space radially between the second outer race surface and the second bearing housing surface to damp radial motion of the bearing.

11. The assembly of claim 10, where the first piston seal is axially offset from the second piston seal.

12. The assembly of claim 10, where the first piston seal is axially aligned with the second piston seal.

* * * * *